Oct. 6, 1964  E. A. VERRINDER ETAL  3,151,753
METHOD OF HANDLING CASES
Original Filed July 11, 1955  5 Sheets-Sheet 1

INVENTORS
ERNEST A. VERRINDER
EARLE J. McGRATH
BY Hans G. Hoffmeister.
ATTORNEY

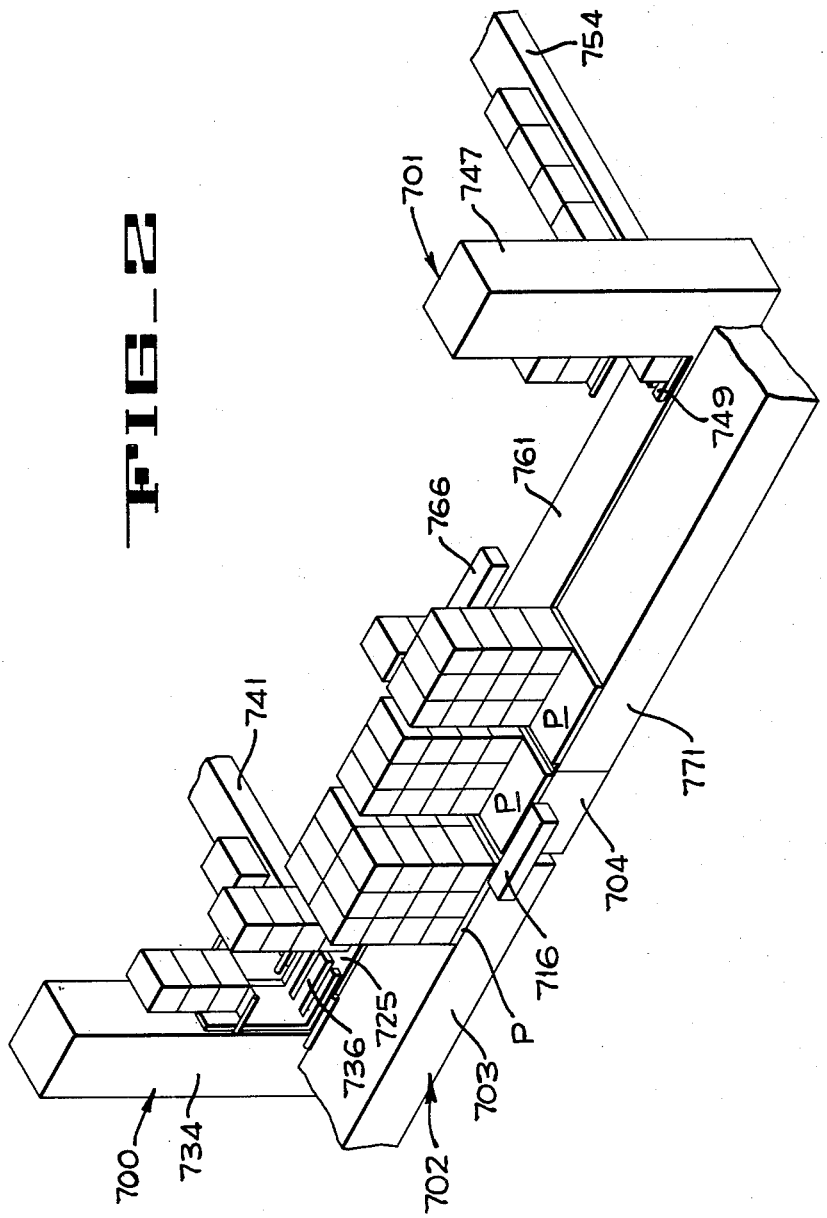

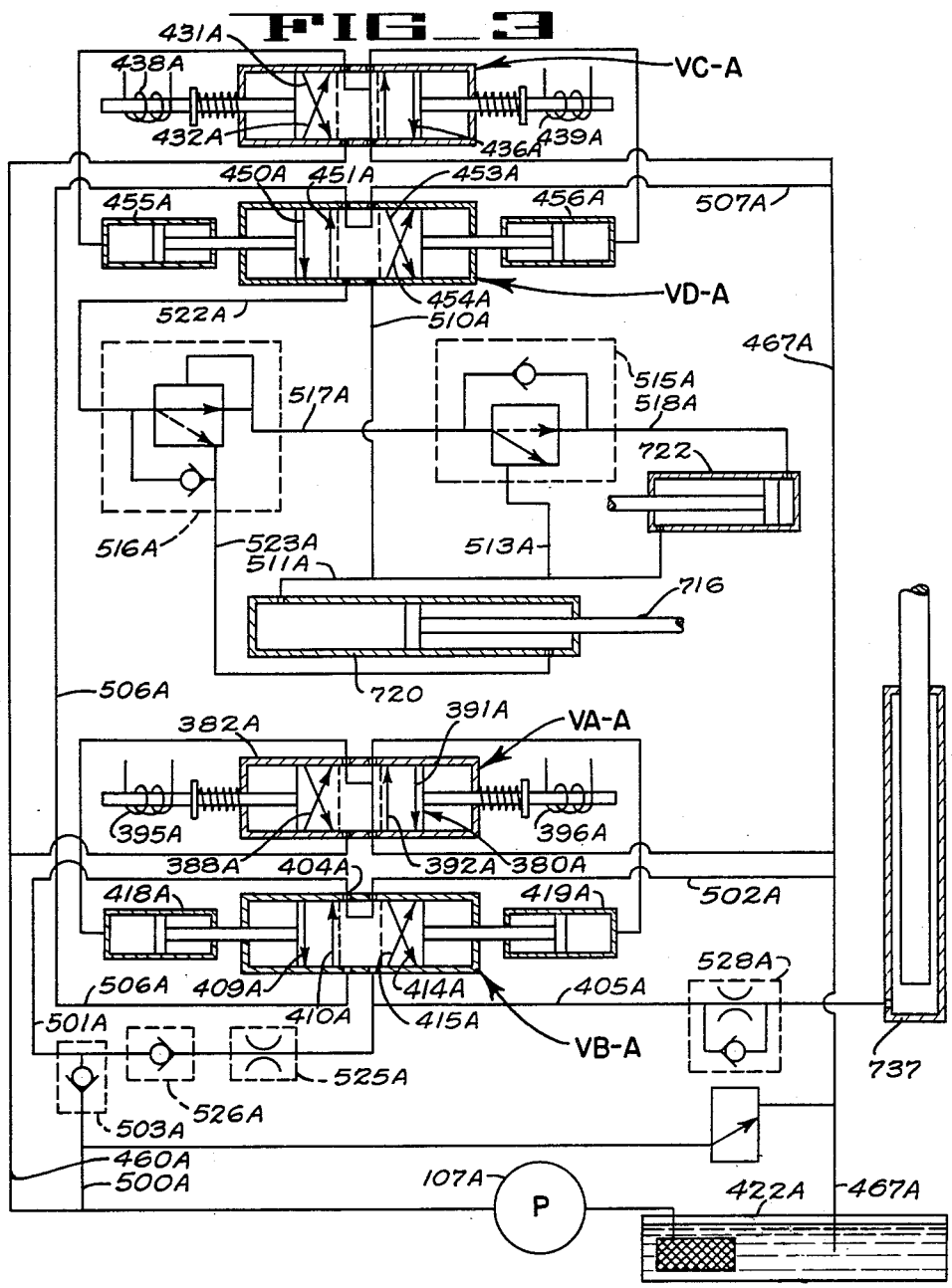

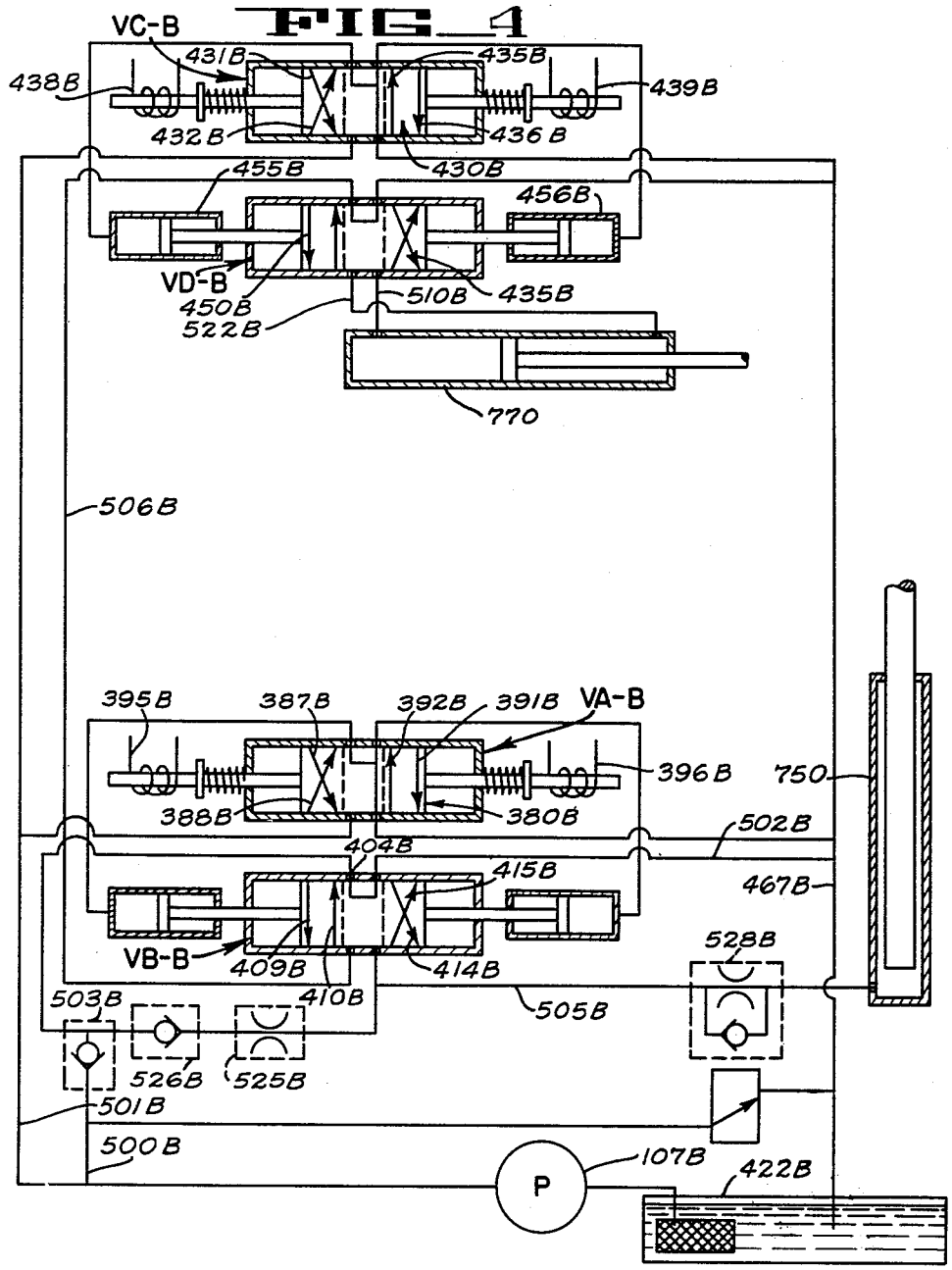

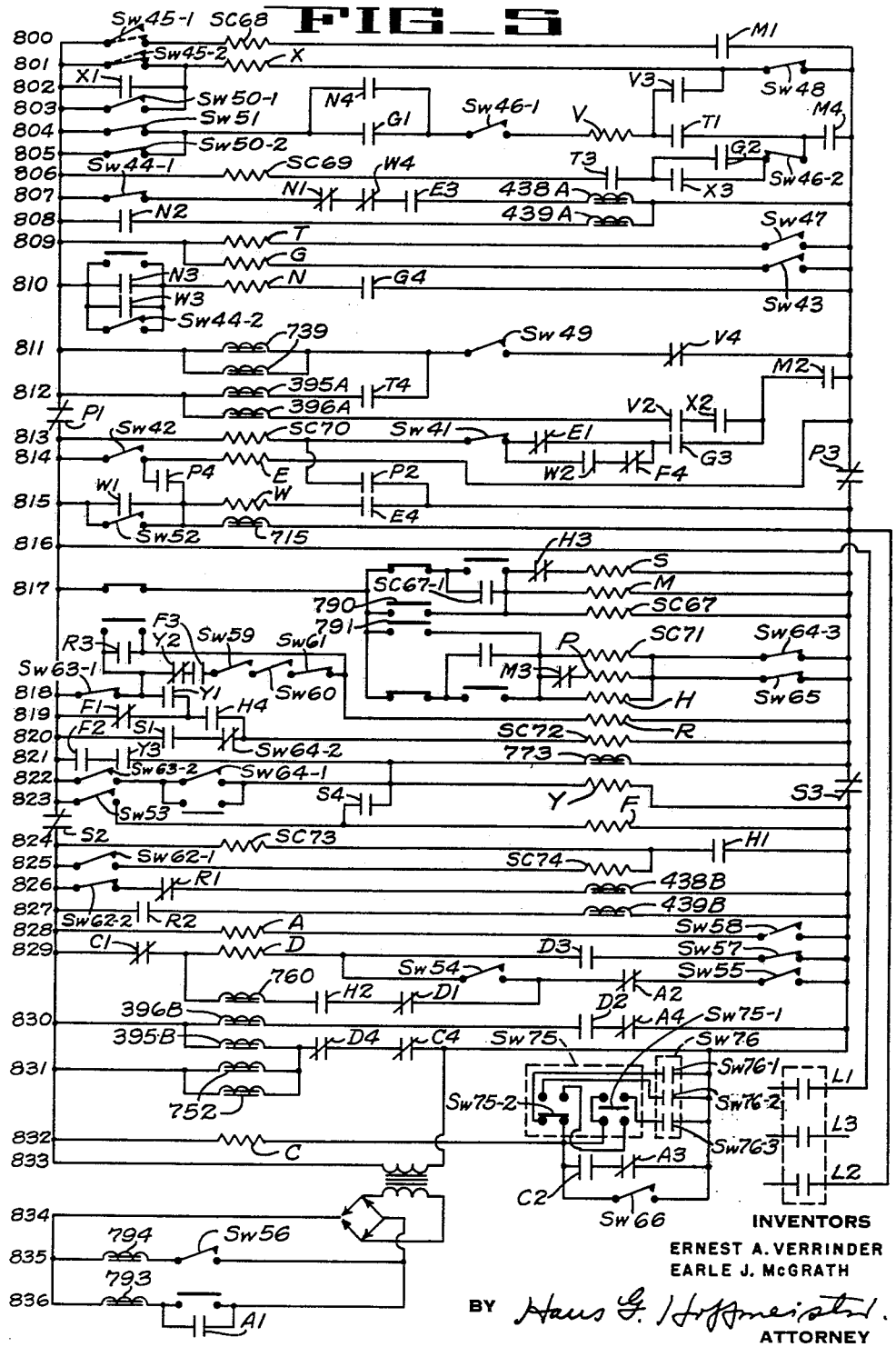

United States Patent Office 3,151,753
Patented Oct. 6, 1964

3,151,753
METHOD OF HANDLING CASES
Ernest A. Verrinder, Riverside, and Earle J. McGrath, Chula Vista, Calif., assignors to FMC Corporation, a corporation of Delaware
Original application July 11, 1955, Ser. No. 521,011, now Patent No. 2,993,315, dated July 25, 1961. Divided and this application Dec. 9, 1960, Ser. No. 74,926
1 Claim. (Cl. 214—152)

This application is a division of our copending application, Serial No. 521,011 filed July 11, 1955, which issued on July 25, 1961, as U.S. Patent No. 2,993,315.

This invention pertains to an improved method of loading cases on and removing cases from a support surface, such as a pallet.

In present day processing plants pallets are used extensively for handling both semi-finished and finished products. When the product is disposed in cases, the cases can be stacked one on top of the other and several stacks can be arranged side-by-side on the pallet. With such an arrangement, the cases can be economically and efficiently moved from place to place in the plant by means of a fork lift truck that has tines which are adapted to be inserted in or under the pallet to lift the pallet and the load of cases thereon.

In bottling plants, bottles are continuously being washed, filled and put in cases, and cases of full bottles are continuously being stacked on pallets for removal from the plant. Since cases of full bottles are quite heavy, it is difficult in a modern plant for men to continuously stack full cases on pallets fast enough to keep up with the filling and casing operations.

It is an object of the present invention to provide an efficient method of loading cases of bottles or the like on a pallet.

Other and further objects and advantages of the present invention will become apparent from the following description taken in connection with the accompanying drawings.

FIG. 2 is a fragmentary diagrammatic perspective of the machine of FIG. 1.

FIGS. 3 and 4 are schematic diagrams of the hydraulic control circuits used in the arrangement of FIG. 1.

FIG. 5 is a schematic wiring diagram of the electrical control system used in the arrangement of FIG. 1.

Figure 1:
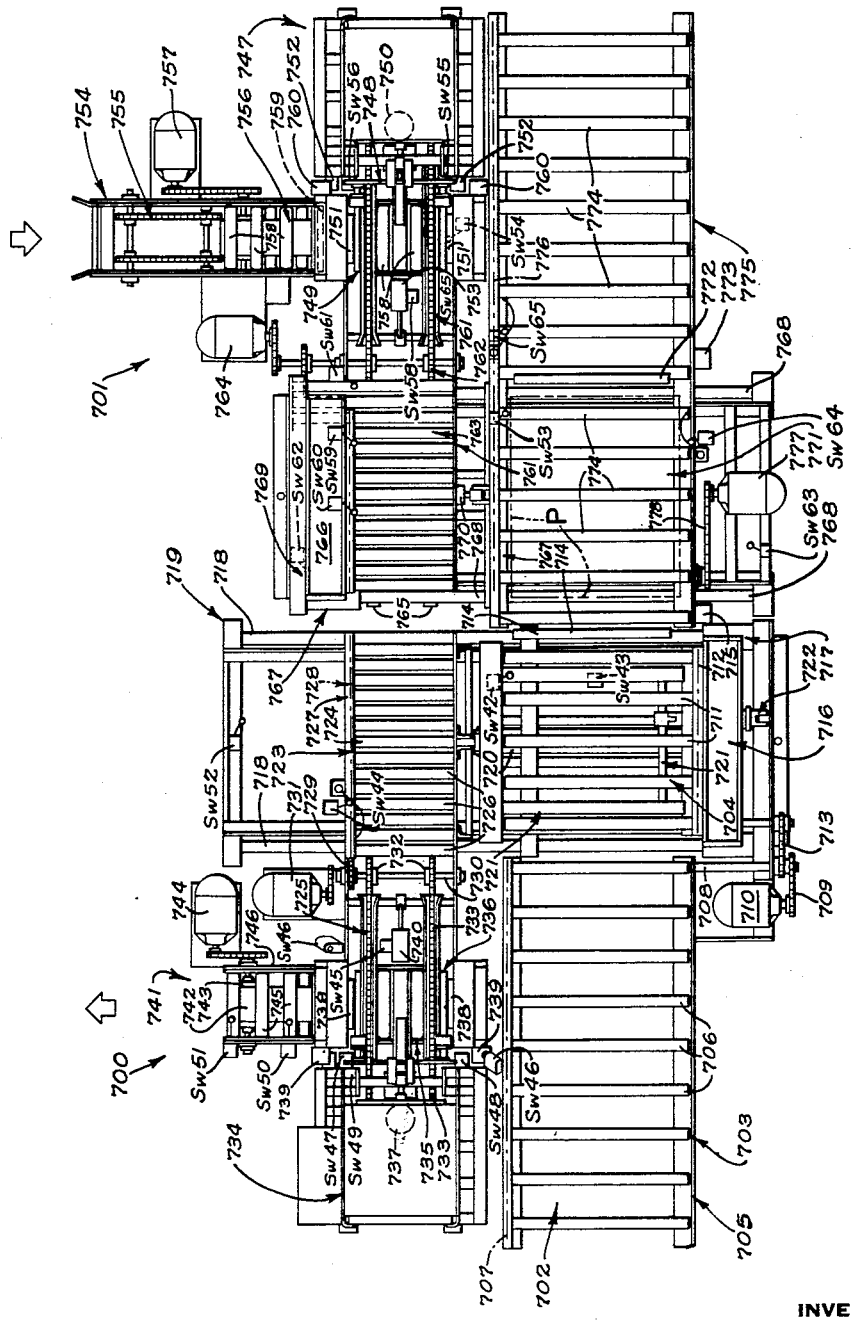
FIG. 1 is a plan of the case handling machine of the present invention.

In FIGURES 1 and 2 one embodiment of the case handling machine of the present invention is illustrated. In this arrangement, two complete machines 700 and 701 are set up side by side. The controls of these machines may be set so that the machines operate simultaneously, with machine 700 operating as a pallet unloader, and machine 701 operating as a loader to load cases on pallets which have previously been unloaded by machine 700 and discharged therefrom. With another setting of the controls, the pallet unloading machine 700 is operated alone, using only the pallet conveyor of machine 701 to carry away empty pallets. With still another setting of the controls, the pallet loader 701 is operated alone, using only the pallet conveyor of unloader 700 to supply empty pallets to be loaded.

The pallet unloading machine 700 comprises a pallet conveyor 702 having two aligned roller sections 703 and 704. Section 703 comprises a frame 705 and a plurality of rollers 706 rotatably mounted in the frame. The rollers 706 are driven simultaneously by an interconnecting chain and sprocket mechanism 707 which is driven by a shaft 708. A chain and sprocket drive 709 connects the shaft 708 to a motor 710. The roller section 703 is arranged to receive a pallet loaded with stacks of cases of empty bottles and move the loaded pallet onto the roller section 704 which comprises a plurality of rollers 711 interconnected in driving relation by a chain and sprocket mechanism 712. The roller 711, which is nearest the conveyor section 703, is driven by a chain and sprocket mechanism 713 from the shaft 708.

As the loaded pallet is moved across the roller section 704, it contacts a switch Sw42 and is stopped by a bar 714 which is mounted at the end of the pallet conveyor and is arranged to be moved up to the pallet stopping position by a spring (not shown) and is connected to a solenoid 715 in such a manner that, when the solenoid 715 is energized, the stop bar 714 will be unlatched and lowered to allow a pallet that has been emptied in unloader 700 to pass over the bar and into the pallet loading machine 701. It will be apparent that, when the machine 700 is in operation, the stop bar 714 will remain up until the pallet is completely empty. In this raised position, the stop bar aligns the loaded pallet opposite a ram 716 which is rigidly secured on one end of a carriage 717 that is slidably mounted on stationary rods 718 of a frame 719 for movement transversely over the pallet conveyor section 704. A double-acting hydraulic power cylinder 720 is operatively connected to the ram to move the ram over the pallet conveyor to push a line of stacks off the pallet. Just before the ram 716 moves over the pallet, a parallelogram lift mechanism 721, which in its lowered position holds switch Sw43 closed and is arranged to be actuated by a power cylinder 722, raises the loaded pallet upwardly to the level of the conveying surface of a stack conveyor 723. When the line of cases is shifted onto the stack conveyor, one of the cases contacts switch Sw44. A switch Sw52 is mounted on the frame 719 in position to be actuated by carriage 717.

The stack conveyor comprises a live roll section 724 and an endless chain section 725. The live roll section 724 includes a plurality of rolls 726 suitably mounted for rotation in a frame structure 727 and interconnected by a chain 728 which is trained around a sprocket keyed to each roller and around a sprocket 729 keyed to a drive shaft 730. The shaft 730, which is driven by a motor 731, has a pair of sprockets 732 keyed thereon for driving the chains 733 of the endless chain section 725 of the stack conveyor.

The endless chains 733 are arranged to carry a stack of cases into an unstacker unit 734, which is substantially identical in structure and operation to the unit 22 described in the above mentioned Verrinder et al. Patent 2,993,315. In general, the unstacker comprises a fork carriage 735, a fork 736 mounted on the carriage, a power cylinder 737 for raising the fork carriage, case-supporting blades 738 controlled by solenoids 739, a paddle 740 arranged to actuate a switch Sw45, and a plurality of electrical switches Sw47, Sw48, and Sw49 which are arranged to be actuated by various operating members of the stacker. When a case is removed from a stack in the unstacker, it is deposited on a case discharge conveyor 741 which comprises a belt 742 trained around an idler drum (not shown) and around a drum 743 driven by a motor 744. A plurality of rollers 745 are rotatably mounted in a frame 746 and disposed above the belt 742 and in frictional driven engagement therewith. A photoelectric switch Sw46 has its beam projected across the path of movement of cases in the unstacker unit, and switches Sw50 and Sw51 have actuators disposed in the path of movement of cases being discharged on the case conveyor 741.

The pallet loading machine 701 comprises a stacker unit 747 which is substantially identical to the unit 22 disclosed in the Verrinder et al. Patent 2,993,315. This unit has a fork carriage 748, a fork 749 mounted on the carriage, a power cylinder 750 for raising the carriage 748, case-supporting blades 751 controlled by solenoids 752, a pivotal paddle 753 arranged to actuate a switch Sw58, and a plurality of electrical switches Sw54, Sw55, Sw56, Sw57 (not shown). The stacker is arranged to receive cases one at a time from a full case conveyor 754 which comprises an endless chain section 755 and a live roll section 756. Both of the sections 755 and 756 are driven by a motor 757, the live roll section 756 being driven at a faster speed than the endless chain section 755. The live roll section 756 is similar to the accelerator conveyor 21 of FIG. 3 in said Verrinder et al. Patent 2,883,315 and has a plurality of rollers 758 which lie between the fingers or tines of the fork 749, the top surfaces of the rollers being above the tops of the fingers when the fork is in its lowered position. Movement of cases along the conveyor 754 is controlled by a stop bar 759, which is spring urged upwardly to a latched, case-arresting position, and is connected to a solenoid 760 so that, when the solenoid is energized, the stop bar is unlatched and permitted to drop by gravity.

After a stack of cases is formed in the stacker unit 747, it is deposited on a stack conveyor 761 comprising an endless chain section 762 and a live roll section 763, both of which are driven from a motor 764. The endless chain section 762 has an upper run that extends into the stacker 747 at a level below the top of the rollers 758 of the case conveyor section 756, but above the tops of the fingers of the fork 749 when the fork is in lowered position. Electric switches Sw60, Sw59, and Sw61 are mounted to extend into the path of movement of a stack of cases being advanced on the stack conveyor 761. A pair of fixed stops 765 stop the first stack of cases. The second and third stacks come to rest against the preceding stack. A ram 766 is rigidly mounted on one end of a carriage 767, that is slidably mounted on stationary rods 768 of a support frame 769. The ram 766 is moved by means of a power cylinder 770, from a loading position against switch Sw62, transversely over the live roll section 763 of the stack conveyor 761 to push a line of stacks of cases off the stack conveyor and onto an empty pallet P (shown in dot-dash lines) that has been positioned on a pallet discharge conveyor 771, substantially opposite the ram and against a switch Sw53. When the ram reaches the end of its stroke, the ram carriage contacts a switch Sw63 and the cases, that have been shifted onto the pallet, contact a switch Sw64. A stop bar 772 intercepts each empty pallet as it is discharged from the pallet unloading machine 700 and aligns the pallet with the ram 766. The stop bar is urged to its upper, pallet-aligning position by a spring (not shown) and is pulled down to a pallet release position by the energization of a solenoid 773 to which the stop bar is connected.

The pallet discharge conveyor 771 comprises a plurality of parallel rollers 774 rotatably mounted in a frame structure 775. The rollers are interconnected by a chain drive mechanism 776 and are driven by a motor 777 through a chain and sprocket drive 778. When the loaded pallet is discharged by conveyor 771, the pallet contacts a control switch Sw65 that is mounted adjacent the conveyor.

When both machines 700 and 701 are operated simultaneously, a pallet loaded with two lines of stacks of cases of empty bottles is deposited on the pallet conveyor section 703 by means of a fork lift truck. The pallet conveyor moves the loaded pallet onto the roller section 704 where the transversely moving ram 716 pushes the lines of stacks onto the stack conveyor 723. The conveyor 723 carries the stacks one at a time into the unstacker unit 734 where each case is removed from the stack and discharged from the machine on the case discharge conveyor 741.

After both lines of stacks of cases have been shifted onto the stack conveyor 723 by the ram 716, the stop bar 714 is lowered and the empty pallet is moved out of the pallet unloading machine 700 and into the pallet loading machine 701. As soon as an empty pallet is in position against the stop bar 772 of the pallet loading machine 701, the ram 766 will push a completed line of stacks onto the empty pallet after they have been delivered to the stack conveyor 761 by the stacker unit 747. When two lines of stacks of cases have been formed on the pallet, the stop bar 772 is released to permit the loaded pallet to be carried out of the machine by the discharge conveyor 771.

It will be apparent that, while the empty pallet is being loaded by machine 701, another pallet may be unloaded in the machine 700, and a third pallet, loaded with cases of empty bottles may be deposited on the pallet conveyor section 703. Accordingly, the machines may be so arranged that as soon as a pallet loaded with cases of full bottles is moved out of the machine 701 by discharge conveyor 771, an empty pallet is shifted from machine 700 to machine 701, and a pallet load of cases of empty bottles is shifted to unloading position on conveyor section 704.

*Hydraulic Circuit*

The hydraulic circuit employed in the pallet unloader machine 700 is illustrated in FIG. 3. This circuit is substantially the same as the system shown in FIG. 25 in said Verrinder et al. patent that is used in the combination loader-unloader machine of FIG. 1 in said Verrinder et al. Patent 2,993,315. Accordingly, the parts of the hydraulic circuit of FIG. 3, that are identical to parts in said FIG. 25 will be given identical reference numerals followed by a suffix A.

When the pump 107A is operating, fluid under pressure is directed through line 500A–501A to port 404A of control valve VB–A. When the fork raising solenoid 396A of pilot valve VA–A is energized fluid is directed through cross-passage 414A of valve VB–A and line 504A to power cylinder 737 to raise the fork carriage 735. When the fork lowering solenoid 395A of pilot valve VA–A is energized, the power cylinder 737 is drained through line 502A–467A and fluid is directed through passage 409A of valve VB–A and line 506A to the control valve VD–A. When there is fluid in line 506A and the pallet unloading solenoid 438A of pilot valve VC–A is energized, the fluid is directed through passage 450A, line 522A, valve 516A, line 517A, integral check valve portion of valve 515A, and line 518A to the power cylinder 722 to elevate the lift mechanism 721. When the lift mechanism is fully raised, fluid pressure builds up in line 522A and valve 516A, causing the valve to swing to the dotted line position to port fluid through line 523A to the unload end of the ram power cylinder 720 to cause the ram to be moved in the direction to unload lines of stacks from the pallet. If the ram return solenoid 439A of pilot valve VC–A is energized when there is fluid in supply line 506A, the fluid is directed through cross-passage 453A of valve VD–A and line 510A–511A to the return side of the power cylinder 720 to return the ram 716 to its initial unload position. When the ram reaches its unload position, pressure builds up in line 513A and valve 515A, causing valve 515A to swing to the dotted line position and to permit the lift power cylinder 722 to drain through line 518A, valve 515A, line 517A, valve 516A, line 522A, cross-passage 454A and line 507A–467A.

The hydraulic circuit employed in the pallet loading machine 701 is illustrated in FIG. 4. This circuit is substantially the same as that used in the combination loader-unloader machine of FIG. 1. in said Verrinder et al. patent. Accordingly, parts in the circuit of FIG. 4, that are identical to parts in said FIG. 25, will be given identical reference numerals followed by a suffix B.

When the pump 107B is operating, fluid is directed through line 500B–501B to port 404B of control valve VB–B. When the fork raising solenoid 396B of pilot valve VA–B is energized, fluid is directed through cross-passage 414B of valve VB–B and line 505B to power cylinder 750 to raise the fork carriage 748. When the fork lowering solenoid 395B of pilot valve VA–B is energized, the power cylinder 750 is drained through lines 502B–467B and fluid is directed through passage 409B of valve VB–B and line 506B to the control valve VD–B. When there is fluid in line 506B and the pallet loading solenoid 439B of pilot valve VC–B is energized, the fluid is directed through cross-passage 453B of valve VD–B and line 510B to the load end of the ram powder cylinder 770 to move the ram in a direction to push stacks of cases onto the pallet. If the ram return solenoid 438B of pilot valve VC–B is energized when there is fluid in supply line 506B, the fluid is directed through passage 450B of valve VD–B and line 522B to the return end of the ram power cylinder 770 to return the ram to the load position.

*Electric Control Circuit*

The electric control circuit for the modified arrangement, shown in FIG. 1, is illustrated in FIG. 5. In FIG. 5, the auxiliary circuits are numbered 800 to 836 inclusive, and the switches are shown in their normal position, as they were wired by the switch manufacturer. It will be understood, however, that the paddle 740 (FIG. 1) in the unstacker unit 734 is initially adjusted so that, when the paddle is in its normal upper position, switch Sw45 is actuated to close the normally open contact Sw45–1 in circuit 800 and open the normally closed contact Sw45–2 in circuit 801. These intially adjusted positions are shown in dotted lines in FIG. 5, while the normal positions are shown in full lines. FIG. 1 shows the positions of the various elements of the machines 700 and 701 at the start of a cycle. It will be noted that, in the pallet unloading machine 700, the ram 716 is in the unload position, the pallet stop bar 714 is elevated, the lift mechanism 721 is in its down position holding switch Sw43 in circuit 809 closed, and the fork carriage 735 is in its lowered position holding switch Sw47 in circuit 809 closed. In the pallet loading machine, the ram 766 is in the load position contacting switch Sw62 to hold contact Sw62–1 in circuit 825 closed and contact Sw62–2 in circuit 826 open, the stop bar 772 is raised, an empty pallet P is positioned against the stop bar 772 holding switch Sw53 in circuit 823 closed, and the fork carriage 748 is in its lowered position holding switch Sw55 in circuit 829 closed.

To put both machines 700 and 701 into operation, a master switch Sw40 (FIG. 5) is closed to energize conductors L1 and L2. The unload start button 790 and the loader start button 791, both in circuit 817, are pushed to energize the circuit and energize relays M and H and to close the magnetic starter coil SC–67 of the motor of pump 107A (FIG. 3) and starter coil SC–71 of the motor of pump 107B (FIG. 4). Also, the photo relay Sw46 in the unstacker unit 734 is turned on so that the beam is projected across the unstacker.

Thus, at the start of the cycle, relays M and H in circuit 817, and relays T and G in circuit 809 are energized. Since M2 and G3 in circuit 813 are closed, the starter coil SC–70 of the pallet conveyor motor 710 is closed and the pallet conveyor starts up to bring the pallet load of cases of empty bottles onto the roller section 704 adjacent the unloader ram 716. The loaded pallet contacts and closes switch Sw42 in circuit 814 to energize relay E. Contact E1 in circuit 813 opens, de-energizing the coil SC–70 of the pallet conveyor motor 710 causing said conyevor to stop. Since relay T is energized, contact T4 in circuit 812 is closed whereby the fork lowering solenoid 395A is energized and the fluid under pressure in line 506A from pump 107A is directed to port 444A of valve VD–A (FIG. 3). Then, when the pallet closes switch Sw42 in circuit 814 to energize relay E, contact E3 in circuit 807 (FIG. 5) is closed, energizing the pallet unloading solenoid 438A, and causing the pressurized fluid at port 444A of valve VD–A (FIG. 3) to be directed through passage 450A, sequence valves 516A and 515A and line 518A to the power cylinder 722 to raise the lift mechanism 721. As the lift mechanism moves upward, switch Sw43 in circuit 809 opens and relay G is de-energized. Contact G2 in circuit 806 is opened, de-energizing motor starting coil SC–69 and stopping the stack conveyor 723. When the lift mechanism is fully raised, the sequence valve 516A ports fluid into line 523A to be directed to the unload side of the ram power cylinder 720. This causes the ram to be moved toward the stationary stack conveyor 723, pushing the line of cases in front of it until the line of stacks closest to the stack conveyor is positioned on the stack conveyor in contact with switch Sw44, opening contact Sw44–1 in circuit 807 to de-energize the pallet unloading solenoid 438A to stop the ram and closing contact Sw44–2 in circuit 810 to energize relay N, which locks in through contact N3.

When relay N is energized, contact N1 in circuit 807 is opened and contact N2 in circuit 808 is closed, energizing the carriage return solenoid 439A. The ram is then returned to the unload position and the lifting mechanism 721 is lowered, closing switch Sw43 in circuit 809 to energize relay G. Contact G2 in circuit 806 closes to energize the motor starting coil SC–69 and start stack conveyor 723 again, whereby the stacks of cases are carried one by one into the unstacker unit 734. The first stack of cases hits paddle 740 and actuates switch Sw45 to open contact Sw45–1 in circuit 800 and close contact Sw45–2 in circuit 801, whereby the case discharge conveyor motor starter coil SC–68 is de-energized and relay X is energized. As the stack enters the stacker, it breaks the beam of photo relay Sw46 to close contact Sw46–1 in circuit 804 to energize relay V which locks in through contact V3. Contact Sw46–2 in circuit 806 is opened, coil SC–69 is de-energized and the stack conveyor is stopped. When relay V is energized, contact V4 in circuit 811 is opened, de-energizing the fork lowering solenoid 395A, and contact V2 in circuit 812 is closed, energizing the fork raising solenoid 396A. As the fork is elevated, switch Sw47 in circuit 809 is allowed to open, de-energizing relay T and opening contact T1 in circuit 804. As the fork carriage reaches the top of its stroke, it opens switch Sw48 in circuit 801, de-energizing relay X and relay V in circuit 804.

When relays X and V are de-energized, contacts X2 and V2 in circuit 812 are opened and the fork raising solenoid 396A is de-energized. Since the fork lowering solenoid 395A is also de-energized, the pilot valve VA–A is in centered position and the fork is allowed to move downward slowly.

In its lowering movement, the carriage contacts and closes switch Sw49 in circuit 811, whereby the solenoids 739 are energized to project the blades 738 inwardly into the path of the descending stack of cases. The switch Sw49 is so located that the blades will permit the lowermost case to continue downwardly while arresting the downward movement of the rest of the stack. When the fork reaches its lower position, it closes switch Sw47 in circuit 809, energizing relay T and closing contact T1 in circuit 804 to energize relay V. The case is deposited on the case discharge conveyor 741, which carries it out of the machine. As the case leaves the unstacker unit, it contacts switch Sw50 to close contact Sw50–1 in circuit 803, energizing relay X and closing contact X2 in circuit 812. Since the beam of the photo relay Sw46 is still broken by the cases remaining in the unstacker, contact Sw46–1 in circuit 804 is still closed and relay V is still energized. Then, with contacts V2 and X2 in circuit 812 closed, the fork raising solenoid 396A is again energized and the fork is raised and the case unstacking operation is repeated until all the cases are discharged one by one from the unstacker. When the last case leaves the unstacker, the beam of the photo relay Sw46 is no longer broken. Accordingly, contact Sw46–1 in circuit 804 is opened, relay V is de-energized, and contact V2 in circuit 812 opened whereby the fork raising solenoid 396A is de-energized and the unstacking operation is stopped. Similarly, since the photo relay beam is no longer broken, contact Sw46–2 in circuit 806 is closed and the stack conveyor motor is energized to bring another stack of cases into the unstacker unit.

When the third stack of cases on the stack conveyor 723 clears switch Sw44, contact Sw44–1 in circuit 807 is closed and the solenoid 438A energized to raise the lift mechanism 721 and start the ram across the pallet to push the second line of stacks onto the stack conveyor. Since there is only one line of stacks on the pallet, the ram has to make an extra long stroke in order to shift the line to the stack conveyor. At the end of this stroke the line of cases contacts switch Sw44, opening contact Sw44–1 in circuit 807 to de-energize the pallet unloading solenoid 438A to stop the ram and closing contact Sw44–2 in circuit 810 to energize relay N. Contact N2 in circuit 808 is closed, energizing the carriage return solenoid 439A to return the ram to unload position and to lower the lift mechanism 721. Also, at the end of this extra long stroke, the ram carriage momentarily closes switch Sw52 in circuit 815 and energizes solenoid 715, whereby stop bar 714 is unlatched and permitted to move downwardly out of pallet arresting position. The solenoid 715 remains energized through contact W1 in circuit 815. The pallet conveyor motor starter coil SC–70 in circuit 813 is energized through contacts W2, F4, G3, and M2, contact G3 being closed when the lift mechanism 721 lowers and closes Sw43 in circuit 809. The pallet conveyor then moves the empty pallet into the pallet loading machine. It is to be noted that if a pallet is still being loaded in the pallet loading machine, switch Sw53 in circuit 823 will be held closed by the pallet being loaded and relay F will be energized. Contact F4 in circuit 813 will then be open and the pallet conveyor of the unloading machine cannot be energized until the pallet being loaded in the loading machine is moved away from switch Sw53. When switch Sw53 is cleared, the empty pallet is moved into the loading machine, releasing switch Sw42 in circuit 814. As soon as switch Sw42 is opened, relay E is de-energized, contact E4 in circuit 815 is opened and solenoid 715 is de-energized, permitting stop bar 714 to be raised again.

At this time the ram 716 is in the unload position, the lift mechanism 721 is lowered, and the stop bar 714 is in elevated position. With these conditions, the unloading machine is ready to unload another pallet as soon as it is moved to position over the lift mechanism 721 by the pallet conveyor 702.

While the pallet unloading machine 700 is unloading a loaded pallet, the loading machine 701 is loading an empty pallet which was previously delivered to the loading machine by the unloading machine. It is, of course, possible to manually place an empty pallet on the pallet discharge conveyor 771 against the stop bar 772. At the beginning of the loading operation, a selector switch Sw75 in circuit 832 is set to close either or both contacts Sw75–1 and Sw75–2. With a particular setting of the selector switch one of consecutively actuated contacts Sw76–1, Sw76–2, or Sw76–3 of counter switch Sw76 will be connected in the circuit 832. The setting shown in FIG. 5 connects contact Sw76–1 in the circuit. Since the contact Sw76–1 is the fourth contact of Sw76 to be closed and since one contact is closed each time a case is added to the stack being formed, the circuit 832 will be energized when a stack four cases high is formed. Also, at the beginning of the operation, the pallet to be loaded is disposed against the stop bar 772, closing switch Sw53 in circuit 823 and energizing relay F. The ram 766 is in the load position, contacting switch Sw62 to close contact Sw62–1 in circuit 825 and open contact Sw62–2 in circuit 826. The fork carriage 748 is in its lowered position holding closed switch Sw55 in circuit 829. The stop bar 759 is in lowered position and the full case conveyor 754 is operating to advance a case toward the stacker unit.

When the first case enters the stacker, it contacts and closes switch Sw54 in circuit 829 energizing relay D which locks in through D3. Contact D1 in circuit 829 is opened, de-energization solenoid 760 and permitting the stop bar 759 to be raised in front of following cases on the full case conveyor 755. Contact D4 in circuit 830 is opened, de-energizing the fork lowering solenoid 395B and contact D2 in circuit 830 is closed, energizing the fork raising solenoid 396B to cause the fork to start upwardly with the first case. The opening of contact D4 also de-energized the blade solenoids 752 in circuit 831.

In its upward movement, the fork carriage closes switch Sw56 in D.C. circuit 835 to energize solenoid 794 which closes a contact of the case counter switch Sw76 to register the first case. The case is carried upwardly past the de-energized blades 751 until the fork carriage reaches the top of its stroke where it contacts and opens switch Sw57 in circuit 829, de-energizing relay D, and opening contact D2 in circuit 830 to de-energize the fork raising solenoid 396B. Contact D4 in circuit 830 is closed to energize the fork lowering solenoid 395B, permitting the fork to be lowered and switch Sw57 to close. Closing of contact D4 also energizes the solenoid 752 causing the blades to be projected into the path of the case being lowered by the fork. The case is deposited on the blades and the fork continues in its downward movement.

When the fork carriage reaches its lowermost position, it closes switch Sw55 in circuit 829, energizing solenoid 760 to pull the stop bar 759 down and permit the conveyor 754 to move the second case into the stacker unit. The second case contacts and closes switch Sw54 in circuit 829 to energize relay D and start another case elevating cycle. When the last case has been counted and contact Sw76–1 in circuit 832 has been closed, relay C is energized and locked in through contact C2. Contact C4 in circuit 830 is opened, de-energizing the fork lowering solenoid 395B and contact C1 in circuit 829 is opened, de-energizing relay D and opening contact D2 in circuit 830, whereby to de-energize the fork raising solenoid 396B. With both the fork lowering solenoid 395B and the fork raising solenoid 396B de-energized, the fork power cylinder 750 is drained to the reservoir through the needle valve 525B causing a slow descent of the fork and the stack of cases thereon. When the fork deposits the stack on the full case conveyor, the center portion of the case conveyor moves downwardly to deposit the stack on the stack conveyor 761 for removal from the stacking unit. As the stack depresses the center portion of the case conveyor 754 it closes switch Sw58 in circuit 828, energizing relay A and closing contact A1 in D.C. circuit 836 to actuate a solenoid 793 to reset the case counter Sw76. Contact A3 in circuit 832 is opened to de-energize relay C, closing contact C1 in circuit 829. As soon as the stack moves off the paddle 753 which is connected by linkage to the center portion of case conveyor 754, switch Sw58 in circuit 828 opens, de-energizing relay A. Contact A2 in circuit 829 is closed and solenoid 760 is energized to pull down stop bar 759 and permit a new case to enter the stacker unit. The new case contacts and closes switch Sw54 in circuit 829 to energize relay D and start another stack forming cycle.

As the first stack moves along the stack conveyor 761, it momentarily contacts switches Sw61, Sw59 and Sw60, all in circuit 818 and comes to rest against the stops 765. The second stack comes to rest against the first stack, holding switch Sw60 closed. The third stack closes switch Sw59 and momentarily opens switch Sw61. As soon as the third stack clears Sw61, circuit 818 is energized, energizing relay R which locks in through contact R3. Contact R1 in circuit 826 opens, de-energizing the carriage return solenoid 438B, and contact R2 in circuit 827 closes, energizing the pallet loading solenoid 439B.

The ram 766 is moved forwardly to push the first line of stacks of cases onto the pallet. At the end of its stroke, the ram carriage contacts switch Sw63, opening contact Sw63–1 in circuit 818 to de-energize relay R. Contact R2 in circuit 827 is opened and contact R1 in circuit 826 is closed. The ram is returned to its loading position to contact switch Sw62, opening contact Sw62–2 in circuit 826 to de-energize the carriage return solenoid 438B and closing contact Sw62–1 in circuit 825 to energize the stack conveyor magnetic starting coil SC–74 whereby to start the stack conveyor.

When the second line of stacks has been formed in front of the ram 766, the ram is moved forwardly to push it onto the pallet, shifting the first line across the pallet to a position contacting switch Sw64 to close contact Sw64–1 in circuit 822. As before, the ram carriage closes contact Sw64–2 in circuit 822, energizing relay Y which locks in through Y3. Also, the ram carriage opens contact Sw63–1 in circuit 818 to de-energize relay R and cause the ram to be returned to its load position. As soon as the ram carriage releases switch Sw63, contact Sw63–1 in circuit 818 closes, and the pallet conveyor starter coil SC–72 is energized through contact Y1 and H4. Since relay Y is energized, contact Y3 in circuit 821 is energized, energizing the solenoid 773 that pulls the pallet stop bar 772 downwardly out of pallet-arresting position. The loaded pallet is then carried out of the machine by the pallet conveyor 771. As the loaded pallet is moved away from the pallet loading station, it contacts and opens a switch Sw65, in circuit 817. The pallet conveyor continues to advance the loaded pallet out onto the pallet conveyor rolls 774. The pallet stop solenoid 773 in circuit 821 is kept energized until the pallet releases switch Sw53 to de-energize relay F, and open contact F2 in circuit 821. When the solenoid 773 is de-energized, the stop bar 772 will be released to the pallet-arresting position. The pallet loading machine is then ready to receive another empty pallet from the pallet unloading machine. If two pallets are allowed to accumulate on the pallet conveyor rolls 774, switch Sw65 will be held open. As the second line of stacks is pushed onto the pallet, Sw64 is contacted, opening contact Sw64–3 in circuit 817. This will de-energize SC–71 and relay H and shut off all motors on the pallet loading machine 747. The machine will not start again until the pallet, that is holding switch Sw65 depressed, is removed and the start bottom 791 is pushed.

In order to keep associated equipment in full operation, it may be necessary at times to operate only the pallet unloading machine 700. Under other conditions, it may be desirable to operate only the pallet loading machine. To operate the unloader 700 alone, start button 790 in circuit 817 is closed to energize relays M and S. Contact S2 in trunk line L1 is opened and contact S3 in trunk line L2 is opened, thereby cutting out the control circuit of the stacker unit 701. However, contact S1 in circuit 820 is closed to energize the magnetic starting coil SC–72 to start the pallet discharge conveyor 771 of the loading machine. With this arrangement, the unloading machine goes through its normal unloading cycle, explained hereinbefore, using the pallet discharge conveyor of the loading machine to carry away the empty pallets. To operate the loader machine 701 alone, the push button switch 791 in circuit 817 is closed to energize relays P and H. Contacts P1 and P3 in trunk lines L1 and L2, respectively, are opened to cut out the control circuit of the unloading machine. However, contact P2 in circuit 813 is closed to energize the magnetic starting coil SC–70 to start the pallet delivery conveyor 702. With this arrangement, the loader 701 goes through its normal loading cycle, described hereinbefore, using the pallet delivery conveyor of the unloading machine to bring pallets to the loader.

From the foregoing description it will be seen that the present invention provides an apparatus for rapidly and efficiently loading cases on a pallet or removing cases from a pallet. The speed of operation is attained through the unitary movement of an entire line of stacks of cases from a pallet to a conveyor and vice versa, and by the inter-related automatic control arrangements which start each step in the loading and unloading operation immediately after the proceding step has been completed. In the unloading operation, each line of stacks is shifted from the pallet to the stack conveyor as soon as the previously delivered line has been shifted along the stack conveyor a distance sufficient to permit the positioning of the new line on the stack conveyor. Also, each stack is moved into the unstacking unit as soon as the last case of the preceding stack leaves the unstacking unit. Similarly, in the pallet loading machine, the formation of the second stack of cases is begun immediately after the first stack leaves the stacker unit. Also, a new line of stacks is formed in front of the ram, as soon as the preceding line of stacks has been shifted onto the pallet. The use of an accelerator conveyor to form gaps between adjacent cases and stacks of cases, and the use of a power driven ram to move the stacks between the pallet and the stack conveyor assure a rapid and efficient loading and unloading operation.

Having thus described our invention, what we claim as new and desire to protect by Letters Patent is:

The method of handling cases or the like which comprises the steps of positioning a loaded pallet at an unloading station, positioning an empty pallet at a loading station adjacent said unloading station, simultaneously unloading said loaded pallet and loading said empty pallet, and then simultaneously moving the newly loaded pallet away from said loading station, shifting the unloaded pallet to the loading station, and positioning another loaded pallet at the unloading station.

References Cited in the file of this patent

UNITED STATES PATENTS

| | | |
|---|---|---|
| 2,291,645 | Nordquist | Aug. 4, 1942 |
| 2,508,698 | Von Beren | May 23, 1950 |
| 2,517,956 | Albertoli | Aug. 8, 1950 |
| 2,550,587 | Neja | Apr. 24, 1951 |
| 2,579,094 | Rooksby | Dec. 18, 1951 |
| 2,629,503 | Neja | Feb. 24, 1953 |
| 2,702,132 | Van Doren | Feb. 15, 1955 |
| 2,769,557 | Ohr | Nov. 6, 1956 |
| 2,814,397 | Connell | Nov. 26, 1957 |
| 2,844,263 | Dreyer | July 22, 1958 |
| 2,885,097 | Lyon | May 5, 1959 |